H. E. HOOVER.
ELECTRIC MOTOR.
APPLICATION FILED SEPT. 16, 1918.

1,424,164.

Patented Aug. 1, 1922.
2 SHEETS—SHEET 1.

Witness.
Edward T. Wray.

Inventor.
Howard Earl Hoover.
by Parker & Carter
Attorneys.

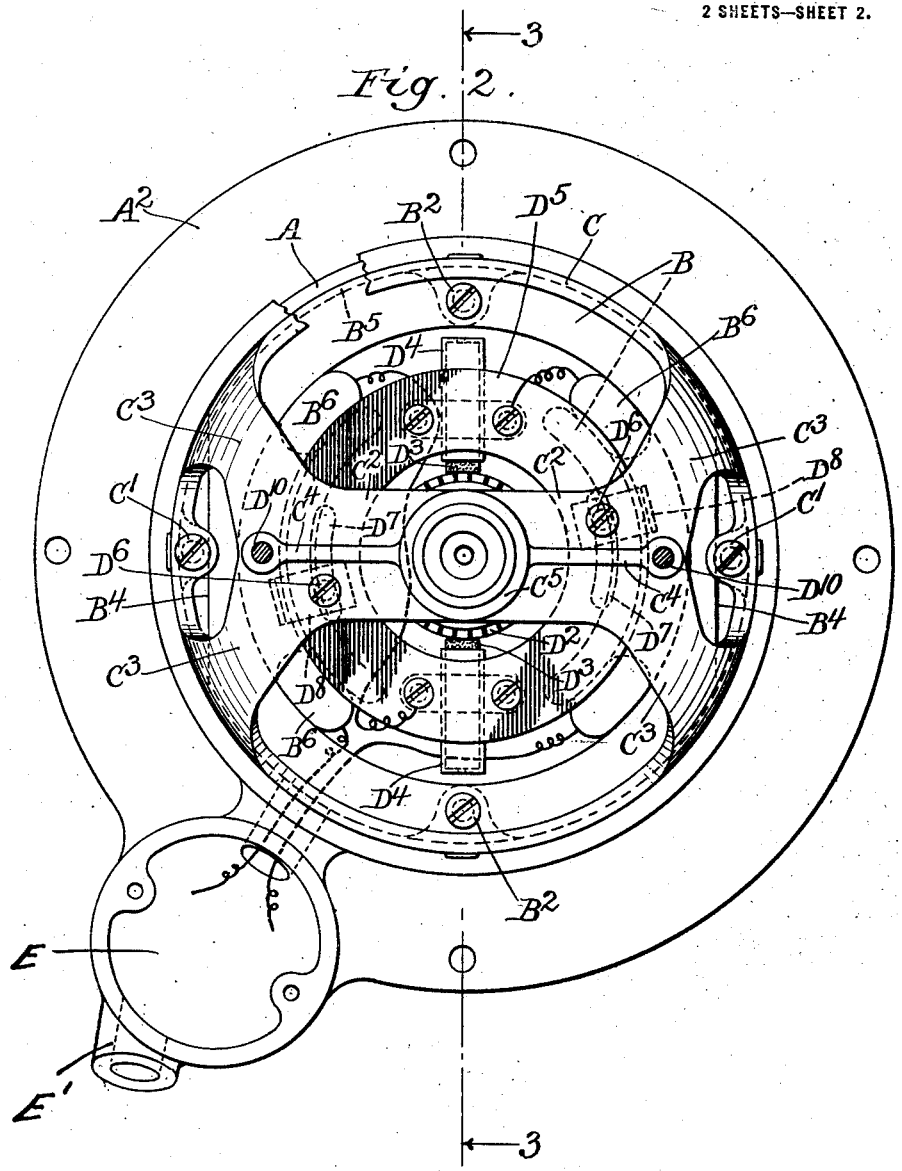

UNITED STATES PATENT OFFICE.

HOWARD EARL HOOVER, OF CHICAGO, ILLINOIS, ASSIGNOR TO THE HOOVER SUCTION SWEEPER COMPANY, OF NORTH CANTON, OHIO, A CORPORATION OF OHIO.

ELECTRIC MOTOR.

1,424,164.  Specification of Letters Patent.  Patented Aug. 1, 1922.

Application filed September 16, 1918. Serial No. 254,256.

*To all whom it may concern:*

Be it known that I, HOWARD EARL HOOVER, a citizen of the United States, residing at Chicago, in the county of Cook and State of Illinois, have invented a certain new and useful Improvement in Electric Motors, of which the following is a specification.

My invention relates to improvements in electric motors such as may be used in connection with suction sweepers and the like though, obviously, the improved type of motor which I have invented might be used in any place where the small sized, relatively low power motor of this type would be appropriate.

One object of my invention is to provide a new and improved form of electric motor which will be exceedingly light, durable and easy to manufacture. Another object is to provide a new and improved form of motor wherein substantially all the mechanical and other parts may be made up of aluminum or some similar metal lighter than iron. Another object is to provide an electric motor which will require a minimum of careful and accurate work in assembling and machining. Another object is to produce an enclosed type motor which by its construction will tend to cause a rapid discharge of heat from its case and, therefore, tend to keep cool. Other objects will appear from time to time in the specification.

My invention is illustrated more or less diagrammatically in the accompanying drawings wherein—

Figure 2 is a plan view with cover or cap and switch removed;

Like parts are indicated by like characters in all the figures.

Figure 1:
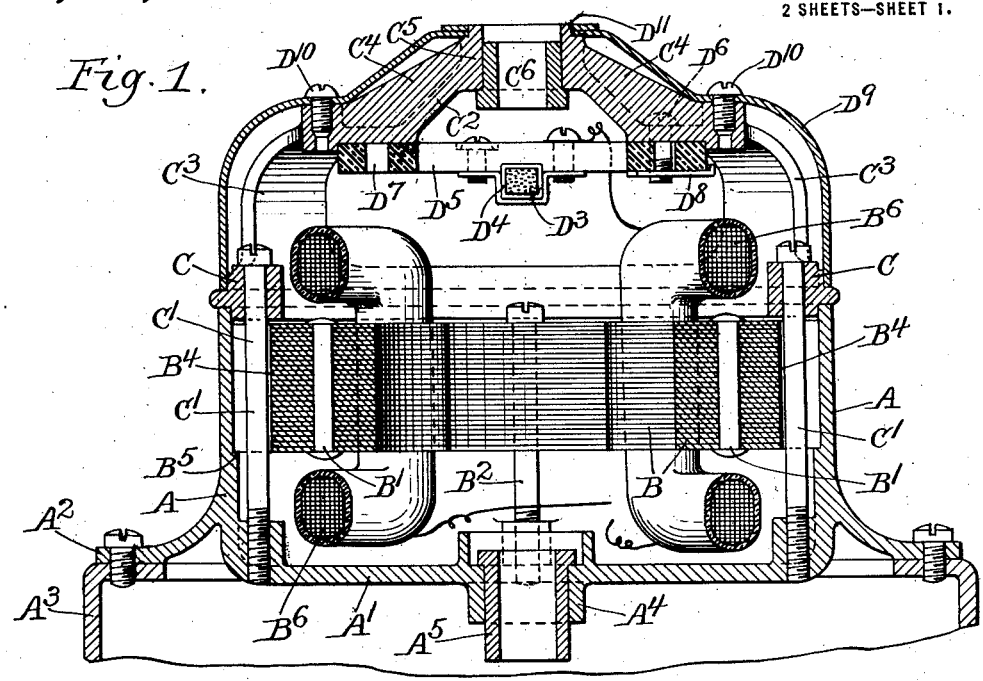
Figure 1 is a section through the machine along the line of the drive shaft with the armature omitted.

A is a cup-shaped motor frame closed at the bottom by a partition wall $A^1$ and open at the top. It is provided with an outwardly projecting flange $A^2$ whereby the motor may be attached to any suitable piece of mechanism such for instance as the housing of a suction sweeper which is shown in section at $A^3$. $A^4$ is a collar surrounding a central perforation in the plate $A^1$. It contains a shaft bearing sleeve $A^5$ in which the armature shaft is adapted to be rotatably mounted.

B is the electro magnetic field part made up of a series of laminated plates held together by rivets $B^1$ and provided with any suitable kind of electric field winding $B^6$. This field part with its winding coils is held together as an integral unit and is dropped into the cup A in such wise that the lower edge of the field laminations rests upon the ledge $B^5$ about half way between the top and bottom of the cup for the greater part of its periphery. The field is in engagement with the inside of the cup and it is held in position by screws diametrically opposed $B^2$ $B^2$ which pass through field laminations and engage the bottom of the base or frame. These field laminations are, however, cut away for a short distance at two diametrically opposed points as at $B^4$ $B^4$ these cut away points being separated approximately 90° from the screws $B^2$.

C is a collar engaging the upper edge of the cup. There is a clearance between the upper plate of the field laminations and the ring above it for otherwise the inequalities in the thickness due to distortion of the laminations would make it extremely difficult to get the exact proportion of the parts and this would tend to disturb the seating of the ring on the case. This collar is held in position by the two holding screws $C^1$ $C^1$ also engaging at their lower ends the member $A^1$ and passing down between the flattened portion of the field plates and the body of the frame or housing itself. Extending across above the collar C and integral with it is a bridge $C^2$ which bridge is attached to the collar by the two arms $C^3$ $C^3$ at either end, these arms being separated and straddling the screws $C^1$. This bridge is reinforced by the flange or web $C^4$ and terminates in a central hub $C^5$ in which is a bearing sleeve $C^6$ for the armature and shaft. It will be noted that the field coils come up to about the same height as the upper portion of the frame and therefore when the cap is removed easy access to the commutator, brushes and associated parts is obtained. This also permits adjustment of the ring which carries the brushes or any other desired manipulation of these parts.

D is the armature shaft. Upon it is mounted for rotation the armature $D^1$ having the commutator D². This commutator is of course, above the field coils and, therefore, in the open space beneath the bridge C² and therefore easy of access. D³ D³ are brushes engaging the commutator and mounted in carrier pockets D⁴ which carrier pockets are mounted on an insulated ring D⁵. This insulated ring is supported by screws D⁶ passing through the bridge C² and through arcuate slots D⁷ in the ring itself. They engage at their lower ends nuts D⁸ so that the position of the two brushes may be changed angularly with respect to the field coils to make the usual motor adjustment. D⁹ is a cover or cap of metal or fiber or any suitable material enclosing the bridge C² and its associated parts. It is held in position by screws D¹⁰ on the bridge and is perforated as at D¹¹ in register with the sleeve C⁶ whereby the bearings of the motor may be lubricated.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The frame or cylinder which encloses the motor is of aluminum and the cover or cap may also be made of aluminum. In any event, the motor parts are closely housed so as to form what may be called a closed motor. This closed type is necessary because of the work to which it is intended to put the motor, that is, to the operation of a vacuum cleaner which involves the constant presence of dust. This enclosing the motor results, of course, in increased heating. The usual practice in the art has been to use open type motors which rid themselves of the heat generated by air currents caused by the rotation of the armature. To resist the heating requires the use of thicker, heavier copper wire.

Making the parts heavy involves also an increased weight which is very undesirable in these light hand apparatuses intended to be used for the most part by women.

By making the frame of aluminum instead of iron, the weight will be reduced, proportionately to their specific gravities. At the same time, there will be a substantial reduction of heat, for the temperature rise due to the operation of the motor proves to be 10° F. less than it would be if the case were made of cast iron. By using aluminum and polishing I avoid the necessity of painting or coating the exterior which is necessary with iron and therefore the conductivity is not decreased. The use of aluminum for this particular purpose has the further advantage that it is not subject to variations by internal strains after the casting has been made. This is not the case with cast iron where castings after they have been made and have stood for some time frequently twist and even crack.

The cover is deep for the reasons elsewhere stated and, therefore, the yoke which is contiguous to the cover has relatively long end portions extending down to the ring which rests upon the frame. These long end portions, of course, increase the danger of breakage and as part of the means of preventing such breakage, I have bifurcated the end portions and extended the two members of each so as to give a long line of contact with the ring. Bifurcating these end portions produces openings and, therefore, an opportunity for inserting between each of their two members one set of screws.

We have spoken of the accumulated laminated plates as constituting a core, though theoretically the core might be built up in some other manner. The field laminations are a pressed fit in the body casting thereby providing good heat conduction to take place between them since there is no air gap. Aluminum has approximately fifty percent greater conductivity than iron which makes it particularly adaptable for the purpose of ridding the motor of the heat.

When the parts are at rest, the center of the armature is below the plane of the center of the field and, therefore, when the field plates are energized it tends to raise the armature and thus take the load off of the shaft bearing sleeve of the armature.

By having the holding down screws in line with the axis of the yoke, the point of attachment between the yoke and the ring with the base is at the nearest possible point to the bearing which the yoke is designed to support. This reduces the chance of breakage to a minimum. This involves bifurcating the ends of the yoke and these widely spread bifurcated ends give a still further rigidity and an extended line of support for the ends of the bridge. This again tends to strengthen the bridge and minimize the danger of breakage.

Figure 3:
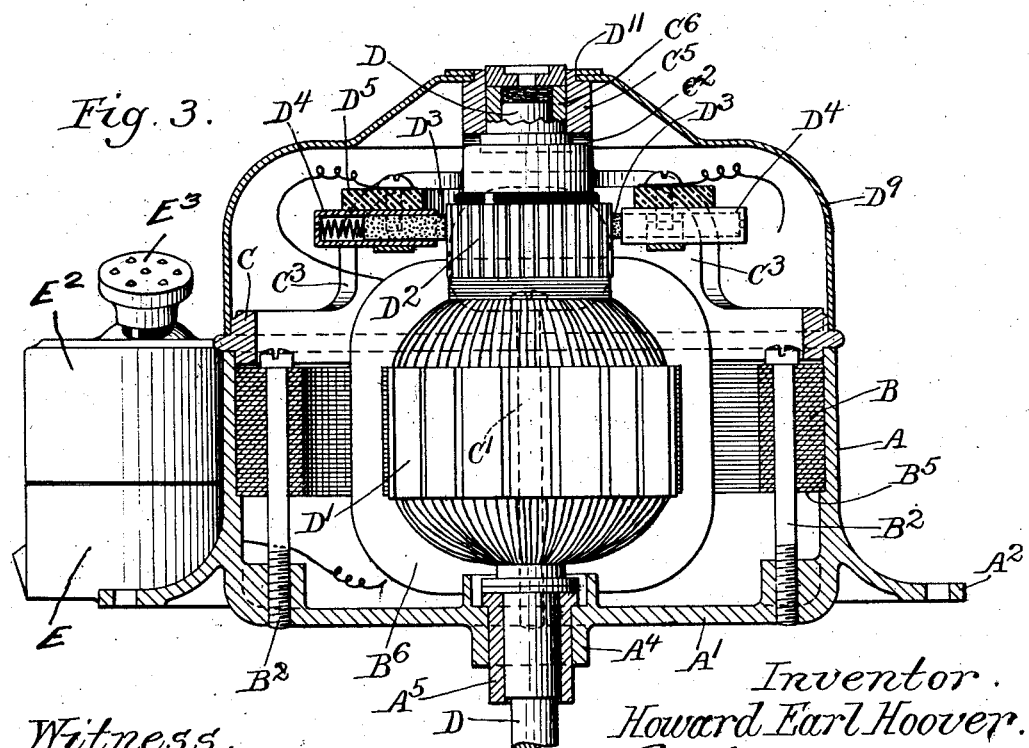
Figure 3 is a section along the line 3—3 of Figure 2.

In Figures 2 and 3 the casing E is shown. It has the outlet E'. The switch mechanism, the details of which are not here shown as they form no part of the present invention, is located within the switch casing E and is covered by the cap E² through which the switch lever E³ extends.

The use and operation of my invention are as follows:—

The main motor frame is first cast and turned as shown. It may or may not have to be bored out and machined to bring it to the proper size depending upon how it is produced. The bearing sleeve or the lower bearing of the armature shaft is then put in place. The field laminations, which have been fastened together by rivets as shown to form the field, are wound separately and the field windings and laminations as a unit are then placed in the cup shaped portion of the main motor base, and this field is then forced down into the base until it rests upon the ledge or shoulder as shown. The two field holding screws are then put in place and tightened up, the field being thus held firmly in position. The armature shaft carrying armature and winding and commutator is then put in place in the lower armature shaft bearing.

The holding collar has meantime been assembled with the upper armature bearing sleeve in place and the insulating ring on the under side of the bridge the brushes being in place in the brush pockets. This ring is now brought into position so that the armature shaft passes through the bearing sleeve, the brushes engage the commutator and the ring itself engages the main motor frame. The two collar holding screws are then put in place and tightened up thus clamping the ring firmly onto the base. The conductors are connected up to supply the electric current in the usual manner and the cover is then put in place on the bridge surrounding it enclosing the armature and brushes at the upper end of the bearing. This cover rests on the ring flange and provides a dust tight housing. The only opening left is in line with the motor shaft and this opening is closed by dust tight oiling means not here illustrated because it forms no part of the present invention.

It will be understood, of course, that this motor is particularly intended for use in connection with electric suction sweepers and the like and the motor shaft will have on its lower end a fan for displacing the dust laden air. This fan would be in a chamber one wall of which would be partially or entirely, as the case may be, formed by the base of the motor frame.

By shaping and assembling the parts as shown the cup or cover or cap is very deep and when removed gives easy access to all the parts.

By making the cylinder or frame which encloses the motor field plate and armature of aluminum, I can reduce the weight of this part of the machine and at the same time reduce the heat incident to the closed motor type.

I claim:—

1. In a motor the combination with a cylindrical frame of a bridge having divergent arms at both ends extending across one end thereof and means in line with the axis of the bridge for holding it in position upon the frame.

2. In a motor the combination with a cylindrical frame of a bridge extending across one end thereof and means in line with the axis of the bridge for holding it in position upon the frame, said means comprising screws clamping downwardly along side the wall of the frame engaging the base thereof, the bridge being provided with two diverging arms adapted to engage the frame one on either side of the holding screws.

3. In a motor the combination with a cylindrical main frame of an annular ring adapted to engage one end thereof, means for holding the ring in position upon the frame, a bridge extending diametrically across the ring and across the frame and a motor bearing carried by said bridge, holding screws adapted to hold the ring in position on the frame, said screws being in line with the central axis of the bridge, the bridge being mounted on the frame by a pair of fingers or arms extending one on either side of each of the holding screws.

4. A motor comprising a cylindrical frame, an annular field core flattened at two diametrically opposed points, and meeting the inside of the frame elsewhere, a shoulder upon the frame upon which the core is seated, means for securing the core in position on such shoulder, a ring resting on one end of the frame and screws passing between the frame and the flattened portions of the core to hold the ring on the end of the frame.

5. A motor comprising a frame, an annular field core flattened at two opposed points, and meeting the inside of the frame elsewhere, a shoulder within the frame upon which the core is seated and screws passing through the core engaging the frame and holding the core rigidly seated upon the shoulder, a ring resting on one end of the frame and screws passing between the frame and the flattened portions of the core to hold the ring on the end of the frame.

6. A motor comprising a frame, an annular field core flattened at two opposed points, and meeting the inside of the frame elsewhere, a shoulder within the frame upon which the core is seated and screws passing through the core engaging the frame and holding the core rigidly seated upon the shoulder, a ring resting on one end of the frame and screws passing between the frame and the flattened portions of the core to hold the ring on the end of the frame, a bridge integral with the ring extending across one end of the frame, said bridge being located on that side of the ring opposed to the frame.

7. A motor comprising a frame, an annular field core flattened at two opposed points, and meeting the inside of the frame elsewhere, a shoulder within the frame upon which the core is seated and screws passing through the core engaging the frame and holding the core rigidly seated upon the shoulder, a ring resting on one end of the frame and screws passing between the frame and the flattened portions of the core to hold the ring on the end of the frame, a bridge integral with the ring extending across one end of the frame, said bridge being located on that side of the ring opposed to the frame, the holding screws which hold the ring in position being in line with the axial line of the bridge.

8. A motor comprising a frame, an annular field core flattened at two opposed points, and meeting the inside of the frame elsewhere, a shoulder within the frame upon which the core is seated and screws passing through the core engaging the frame and holding the core rigidly seated upon the shoulder, a ring resting on one end of the frame and screws passing between the frame and the flattened portions of the core to hold the ring on the end of the frame, a bridge integral with the ring extending across one end of the frame, said bridge being located on that side of the ring opposed to the frame, the holding screws which hold the ring in position being in line with the axial line of the bridge, the end of the bridge where it engages the ring being bifurcated to permit passage of the screw.

9. A motor comprising a frame, a field core, a rotating part thereon, a commutator upon said part, a bridge mounted upon said frame provided with a bearing for the rotating part of the motor, an adjustable brush carrying ring mounted beneath and directly against said bridge in part surrounding and out of contact with said commutator and a removable cap enclosing the bridge and its associated parts.

10. A motor comprising a frame, a field core, a rotating part thereon, a commutator upon said part, a bridge mounted upon said frame provided with a bearing for the rotating part of the motor, an adjustable brush carrying ring mounted beneath and directly against said bridge in part surrounding and out of contact with said commutator, and one or more brush containing members mounted directly upon said ring, and a removable cap enclosing the bridge and its associated parts.

In testimony whereof, I affix my signature in the presence of two witnesses this 12th day of September, 1918.

HOWARD EARL HOOVER.

Witnesses:
MINNIE M. LINDENAU,
CHRISTINA DEANS.